United States Patent [19]
Maruyama et al.

[11] Patent Number: 5,696,886
[45] Date of Patent: Dec. 9, 1997

[54] DATA REPLACEMENT SYSTEM USING HIGH-SPEED CLOCK FOR INITIALIZATION

[75] Inventors: Akira Maruyama; Hiroichi Nara, both of Kawasaki, Japan

[73] Assignee: Fujitsu Limited, Kanagawa, Japan

[21] Appl. No.: 693,803

[22] Filed: Aug. 1, 1996

Related U.S. Application Data

[63] Continuation of Ser. No. 190,663, Feb. 2, 1994, abandoned.

[30] Foreign Application Priority Data

Sep. 17, 1993 [JP] Japan ................. 5-231427

[51] Int. Cl.⁶ .......................... G06F 1/08; G06F 15/177
[52] U.S. Cl. ........................ 395/651; 395/556; 395/494
[58] Field of Search .................. 395/700, 200.07, 395/651, 556, 494; 360/48

[56] References Cited

U.S. PATENT DOCUMENTS

| | | | |
|---|---|---|---|
| 4,016,541 | 4/1977 | Delagi et al. | 395/775 |
| 4,481,578 | 11/1984 | Hughes et al. | 395/200.07 |
| 5,077,656 | 12/1991 | Waldron et al. | 395/325 |
| 5,197,128 | 3/1993 | Campbell et al. | 395/275 |
| 5,212,795 | 5/1993 | Hendry | 395/725 |
| 5,214,781 | 5/1993 | Miki et al. | 395/600 |
| 5,323,352 | 6/1994 | Miyata et al. | 365/222 |
| 5,359,468 | 10/1994 | Rhodes et al. | 360/48 |
| 5,367,209 | 11/1994 | Hauck et al. | 326/45 |

*Primary Examiner*—Jack B. Harvey
*Assistant Examiner*—Jeffrey K. Seto
*Attorney, Agent, or Firm*—Helfgott & Karas

[57] ABSTRACT

A data replacing unit replaces a data packet among a plurality of predetermined data packets in the data replacement manner, which manner is provided by a first control unit as is necessary. An initializing unit generates initializing data using a high-speed clock, clock speed of which is higher than that used by the first control unit, the initializing data being used for initializing the data replacing unit so as to refresh the replacing unit before the data replacement operation is started. A selecting unit, initially and until the initialization is completed, selects data so that the initializing data is provided to the data replacing unit but the control data is not provided thereto.

10 Claims, 7 Drawing Sheets

DATA REPLACEMENT SYSTEM USING HIGH-SPEED CLOCK FOR INITIALIZATION

This is a continuation of application Ser. No. 08/190,663, filed Feb. 2, 1994 now abandoned.

BACKGROUND OF THE INVENTION

1. Field of the Invention

The present invention relates to a data replacement system and, in particular, to a data replacement system which may be used for setting a communication circuit when a system in an apparatus such as a data transmission apparatus is started up.

One example of such a data replacement system has therein various memories such as a Random Access Memory (RAM hereinafter) control unit. Such RAM control unit is accessed by a Central Processing Unit (CPU hereinafter) and mainly performs address-controlling of a RAM acting as a main memory. This RAM control unit has a transmission-apparatus setting function such as communication-circuit alteration function and/or communication-circuit branching function.

A RAM control unit also comprises a RAM, which normally has indefinite data therein when a relevant system is started up, such indefinite data may act as an error, in the RAM control unit, to be detected during a memory device checking operation such as a parity checking operation.

In order to prevent a case where an error is detected during the time an essential operation is carried out, the RAM control unit has to be initialized so that such indefinite data existing in the RAM control unit is removed, each time before the essential operation, such as a communication-circuit alteration operation or a communication-circuit branch operation, is substantially started.

2. Description of Related Art

An example of a data replacement system in related art will now be described with reference to FIG. 1. In the data replacement system of FIG. 1, an initialization such as mentioned above is carried out at the moment of a system start-up operation in either one of the following two manners: A main CPU carries out the initialization by accessing all addresses of the RAM control unit and, alternatively, a sub-CPU carries out the same operation.

In FIG. 1, the data replacement system comprises a decoder 1 and a RAM control unit 2, which inputs thereto addresses a and initialization/connection data b provided from a CPU (either the main CPU or sub-CPU, both not shown in FIG. 1) via the decoder 1. The above addresses a are addresses in a below-described ACM included in the RAM control unit 2 and are used for writing (W) the data b in the ACM. As described below, the above initialization/connection data b is initially data used for the initialization operation and, after the initialization operation is completed, the data b is data used for a communication-circuit setting operation. The data replacement system further comprises a parity adding unit 3 which accompanies the RAM control unit 2 and adds parity bits to the initialization/connection data b and then supplies the parity-bit-added data to the RAM control unit 2. The data replacement system further comprises a main memory (it will be referred to as RAM, hereinafter) 4 for writing thereto and reading therefrom input data input via an input line DI using the initialization/connection data b as addresses c. The data replacement system further comprises a device check unit for performing a checking operation, such as a parity checking operation, by comparing the data c read from the RAM control unit 2 and the parity bits.

The RAM control unit 2 will now be described in detail with reference to FIGS. 2A, 2B, 2C, 2D and 2E. The RAM control unit 2 comprises two sequential counters 21 and 22, and an address control memory (it will be referred to as ACM (Address Control Memory)) 23.

The ACM 23 writes the data b corresponding to addresses thereof according to the above writing address a when the communication-circuit is set or altered, the data b and the addresses a being provided by the CPU as described above.

The sequential counter 21 sequentially generates reading addresses (shown in FIG. 2A) supplied to the ACM 23. In the initialization operation, the counter 21 sequentially reads data previously written in an address table (shown in FIG. 2B) of the ACM 23 so that each address a being provided by the CPU corresponds to a respective one data item being read from the data table. Then, the counter 21 supplies writing addresses c1 for the RAM 4, the writing addresses c1 comprising the read data items.

The sequential counter 22, independent from whether or not the initialization operation is carried out, always provides reading addresses c2, comprising sequential counting values as shown in FIG. 2D, to the RAM 4.

Then, operations in the data replacement system of FIG. 1 will now be described. First, at the moment of the system start-up operation, the CPU performs an initialization access operation on the RAM control unit 2. There, the CPU provides of the addresses a of the RAM control unit 2 and the initialization data b, the provided addresses and data being then separated by the decoder 1. As a result of the separate data and addresses being supplied to the RAM control unit, the initialization data b1 (comprising 8 bits for example) are written in the respective addresses of the RAM control unit 2 according to the provided writing addresses a.

There, one bit, for example, of the parity bit is added to the initialization data b1 by means of the parity adding unit 3, and the resulting data is then written in the RAM control unit 2.

Such an initialization operation as described above causes the indefinite data, existing in the ACM 23 in the RAM control unit 2 before the system start-up operation is carried out, to be completely removed therefrom.

Subsequently to the completion of the above initialization operation, the communication-circuit setting operation is started. There, it is also possible to carry out the initialization operation in a manner such that such a communication-circuit setting operation is carried out as a result of the initialization operation being carried out. Data and addresses are provided by the CPU, wherein the data and addresses provided are ones associated with the ACM 23 and they comprise only data and addresses to be used to alter corresponding data among entire data existing in the ACM 23, the existing contents having been written in the above initialization operation. The provision of the data and addresses from the CPU causes alteration as follows: The initial setting shown in FIG. 2B is altered to the revised setting shown in FIG. 2C so that 1, and 2 are replaced by one another and also 7 and 11 are replaced by one another. This alteration may be made by providing the following data and addresses respectively: The data 2 with the address 1; the data 1 with the address 2; the data 11 with the address 7; and the data 7 with the address 11.

Then, the data bits, including the thus altered data bits, of the ACM 23 are sequentially read according to the reading addresses provided by the sequential counter 21. The thus read data bits, acting as the writing addresses c1, are then supplied to the RAM 4. As a result, the RAM writes data, provided via the line DI, in addresses thereof specified by the supplied addresses c1.

The data-bits thus written in the RAM 4, acting as data output via an output line DO, are then read therefrom according to the reading addresses c2 shown in FIG. 2D which are provided by the sequential counter 22 to the RAM 4.

The relationship between the data input via the line DI thus written in the RAM 4 according to the writing addresses c1 and the output data (to be output via the line DO) read therefrom according to the reading addresses c2 is as follows: As shown in FIGS. 2C and 2D and as described above, the data bits 1 and 2 are replaced by one another and also the data bits 7 and 11 are replaced by one another. Such data replacement results in setting of the communication-circuit in accordance with the altered data including the thus replaced data bits. That is, channels 1 and 2 are replaced by one another and also the channels 7 and 11 are replaced by one another. Thus, due to the replacement of the channels, the communication circuit is set in the state resulting from the above-mentioned channel replacement being performed. The above-described processes are used not only for the purpose of the setting of the communication-circuit, but also similar processes may be used for altering a once set communication-circuit state.

Thus, the RAM control unit 2 is accessed by the CPU only when, as described above, the communication-circuit initial setting and/or later alteration is performed. The above initial setting is done first after the performing of the initialization operation. Once the address table of the ACM 23 has been properly set by means of this accessing by the CPU (so as to obtain the states shown in FIG. 2C, for example), then, according to the data set in the address table (FIG. 2C), the input data input via the line DI may be written into the RAM and the output data to be output via the line DO may be read therefrom as described above repeatedly, without any further accessing by the CPU. That is, the data replacement to be done between the data input via the line DI and the data to be output via the line DO may be performed repeatedly without further CPU's accessing. As a result, without any further accessing by the CPU, the identical communication circuit setting may be repeated accordingly in accordance with the output data to be output via the line DO. In contrast to this, if there is no provision of a device such as the RAM control unit 2, the CPU has to directly access the RAM 4 each time the communication circuit is set even if the circuit to be set is identical to the previous one, that is, even if the replacement between the data input via the line DI and data DO is identical to the previous one. Thus, the provision of the RAM control unit 2 reduces the load borne by the CPU.

Problems resulting from the above arrangement of the data replacement system in the related art will now be described. As described above, before the initialization operation is performed, data in the ACM 23 of the RAM control unit 2 is indefinite and also a parity bit in the data of the ACM 23 is indefinite. There, the device check unit 7 cannot execute any significant checking operation such as parity checking operation because the indefinite data may cause a data error state before the initialization operation is performed.

Such an initialization operation comprises a process wherein CPU's firmware concentrates on accessing entire addresses of the ACM 23. Due to this concentration of CPU's firmware, during this process, any other essential work cannot proceed, resulting in considerable time loss for essential work to be done. Further, there may be a data replacement system having a plurality (N sets) of devices such as the ACM 23, the time for the initialization operation then increasing N times.

As a result, time required for an initialization operation such as mentioned above tends to occupy a large part of the total time of the system start-up operation. This tendency may be emphasized in an apparatus having an ACM such as mentioned above, a memory capacity of which apparatus is relatively large, or having a plurality of ACM, such as in modern apparatuses.

SUMMARY OF THE INVENTION

An object of the present invention is to reduce time required for an initialization operation such as mentioned above in a data replacement system such as that as described above with reference to FIG. 1.

To achieve the above object of the present invention, a data replacement system according to the present invention comprises:

data replacing means for replacing a data item among a plurality of predetermined data items in a data replacement manner, which manner is provided by a control unit as is necessary;

initializing means for generating initializing data using a high-speed clock, clock speed of which is higher than that used by said control unit, said initializing data being used for initializing said data replacing means so as to refresh said replacing means before the data replacement operation is started; and selecting means for selecting data, initially and until the initialization is completed, so that said initializing data is provided to said data replacing means but said control data is not provided thereto.

Further, in the present invention, said selecting means may start the selection, such that said initializing data is provided to said data replacing means but said control data is not provided thereto, when an initializing command is supplied by said control unit (CPU).

Further, in the present invention, said selecting means may start the selection, such that said initializing data is provided to said data replacing means but said control data is not provided thereto, when a initializing command is supplied from outside of said first control means.

Further, preferably, said data replacing means comprises:

storing means for storing said plurality of predetermined data packets or items at respective corresponding addresses; and a second control unit for providing addresses, successively in a writing sequence and a reading sequence respectively, to said storing means so that said plurality of predetermined data items are written therein and read therefrom respectively successively according to said addresses sequentially provided by said second control unit;

wherein:

said writing sequence and reading sequence are set by the initialization operation; and said setting data provided by said first control unit indicates an alteration manner in which either said writing sequence or said reading sequence is initially altered.

Further, preferably, said data replacement system further comprises:

parity adding means for adding a parity bit to the data which will be provided to said second control means, the parity-bit-added data is then supplied to said second control unit; and parity checking means (7) for performing parity checking on the data processed in said second control unit using said parity bit.

Further, preferably, said initializing means comprises:

address generating means for generating addresses; and table means for providing said initializing data in response to said addresses provided by said address generating means using a relevant table.

Further, said address generating means may comprise a counter.

Further, said table means may comprise a read only memory in which said initializing data is previously stored according to the totality of said addresses provided by said address generating means.

Further, preferably:

said selecting means comprises a logical OR gate;

said setting data provided by said first control means and said initializing data provided by said initializing means are simultaneously supplied to said logical OR gate; and said setting data has a logical value of 0 while the initializing operation is performed.

Further, said plurality of predetermined data items may comprise data used for setting a communication circuit.

In the above described arrangement of the present invention, it is possible to greatly reduce time, required for an initialization operation such as mentioned above, in the time required for the system start-up operation. Further, it is also possible to reduce the load borne by the firmware of the CPU.

Other objects and further features of the present invention will become more apparent from the following detailed description when read in conjunction with the accompanying drawings.

DESCRIPTION OF THE PREFERRED EMBODIMENTS

Figure 3:
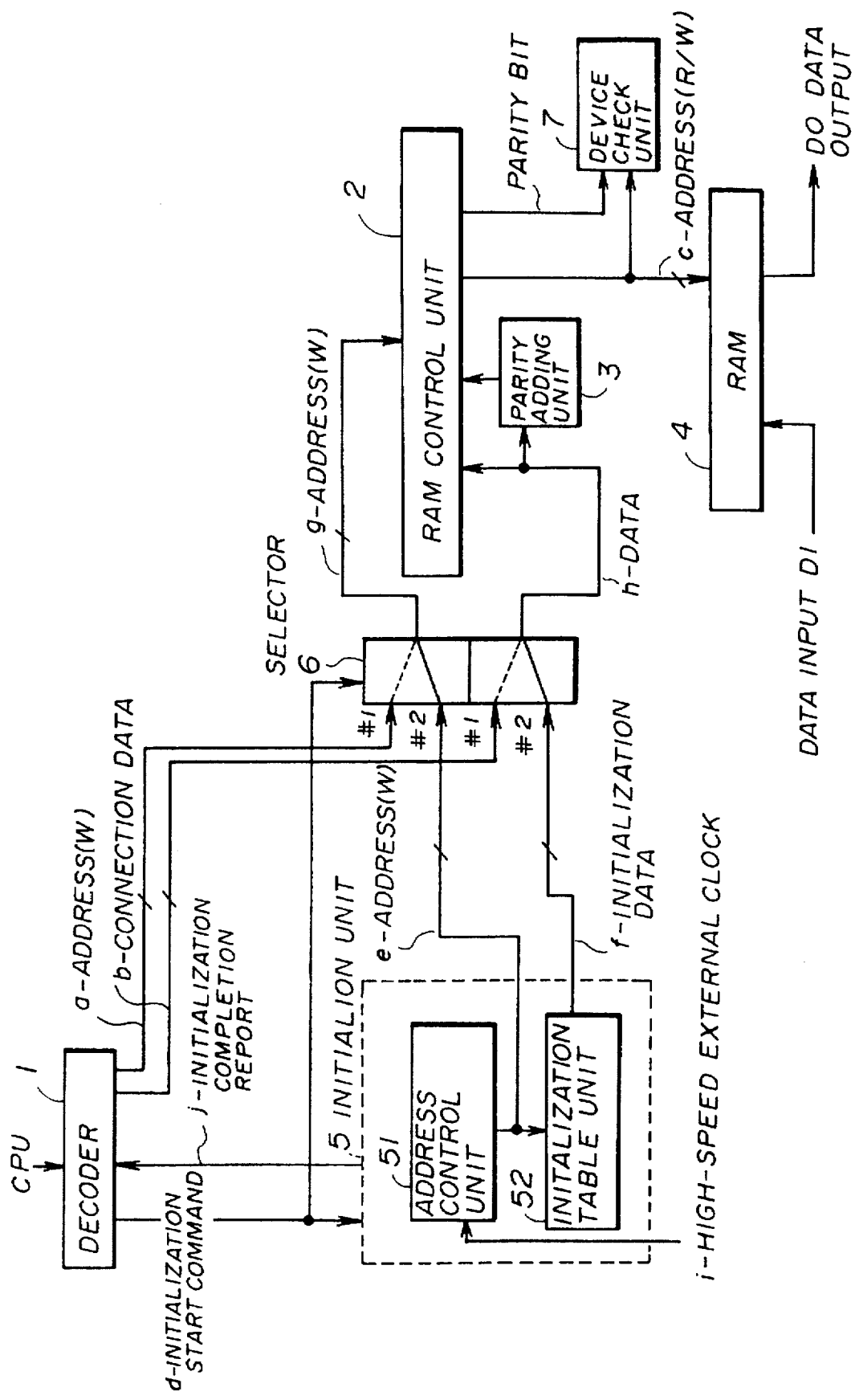
FIG. 3 shows a principle block diagram of an embodiment of a data replacement system according to the present invention.
Figure 4:
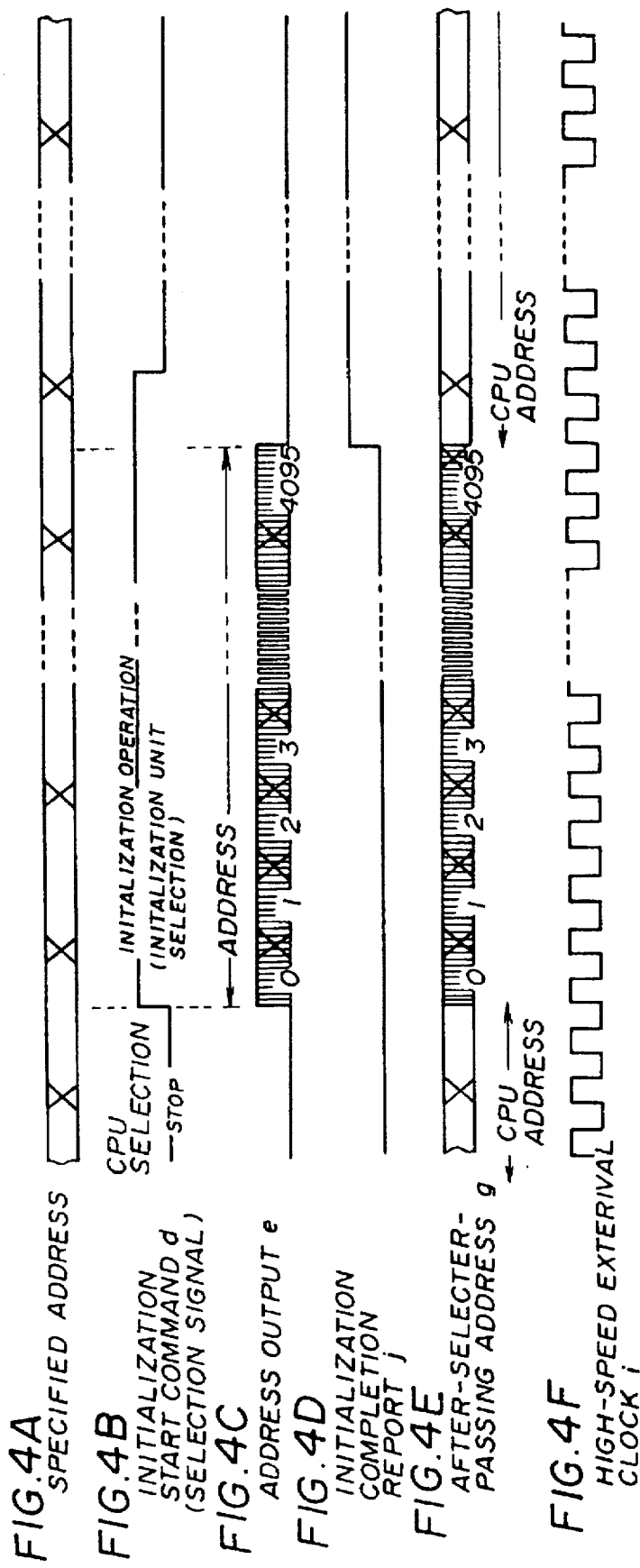
FIGS. 4A, 4B, 4C, 4D, 4E and 4F show operation time-charts illustrating operations carried out by the data replacement system of FIG. 3.

First, basic operations of an embodiment of a data replacement system according to the present invention will be described with reference to FIGS. 3 and 4. In FIG. 3, components having reference numerals identical to those of the components shown in FIG. 1 have functions substantially identical to those of the corresponding components of FIG. 1. RAM control unit 2 and RAM 4 form data replacing means.

Before an initialization start command d (FIG. 4B) having the high level is provided, a selector 6 operates as follows: Due to the low level of the initialization start command d, the selector 6 selects #1 side data, that is, selects the addresses a (FIG. 4A) provided from the CPU via the decoder 1 and also selects the data (communication-circuit connection data) b. These selected addressees a and data b, acting as addresses g (FIG. 4E) and connection data h respectively, are provided to the RAM control unit 2 via the selector 6. In this state, operations in the data replacement system of FIG. 3 are similar to those described for the data replacement system of FIG. 1. There, the communication-circuit initial setting and/or later alteration may be carried out using the addresses g and the connection data h accordingly.

The initialization operation in the system start-up operations in the arrangement of FIG. 3 will now be described. Similar initialization operation may be also executed in a case such as where, during running of a relevant apparatus such as a data transmission apparatus, alteration of the once set communication-circuit becomes in particular required. In such a case, then, the initialization start command d having the high level, acting as a soft strap from the CPU (the term soft strap generally means setting of a register defined in a package by means of a CPU), is provided from the CPU, as shown in FIG. 4B. Such an initialization start command d may be provided from outside instead of from the CPU.

Then, after the initialization start command d having the high level is provided to an initialization unit 5 via the decoder 1 as shown in FIG. 3, the system of FIG. 3 operates as follows: The initialization start command d causes an address control unit 51 to generate and then provide addresses to an initialization table unit 52. The initialization table unit 52 then provides initialization data f, previously stored therein, according to the addresses provided by the address control unit 51. As a result, the initialization unit 5 provides the addresses e and the initialization data f. The initialization start command d, also acts as a selection command signal, switches the selector 6 so that the selector 6 selects the #2 side data (the side shown with solid lines). After the initialization operation is completed, the initialization unit 5 then provides an initialization completion report j to the CPU.

In the initialization operation, the RAM control unit 2 is initialized as follows by means of the initialization unit 5 independent from the CPU: The addresses provided by the address control unit 51 as mentioned above are also provided, as named addresses g, to the RAM control unit 2 via the selector 6 through the solid-line path #2. Simultaneously, the initialization data f provided from the initialization table unit 52 is supplied, as named data h, to the RAM control unit 2 also via the selector 6 through the solid-line path #2. Thus, the RAM control unit 2 is accessed using the addresses g and data h so that the RAM control unit 2 is initialized.

Then, after the initialization unit 5 sends the initialization completion report j to the CPU via the decoder 1 as shown in FIG. 3, the initialization start command d becomes so as to have the low level as shown in FIGS. 4D and 4B. The low level of the initialization start command d switches the selector 6 so that the selector 6 selects the #1 side data, that is, selects the data from the CPU. As a result of this selection, the initialization unit 5 is completely separated from the RAM control unit 2.

Figure 1:
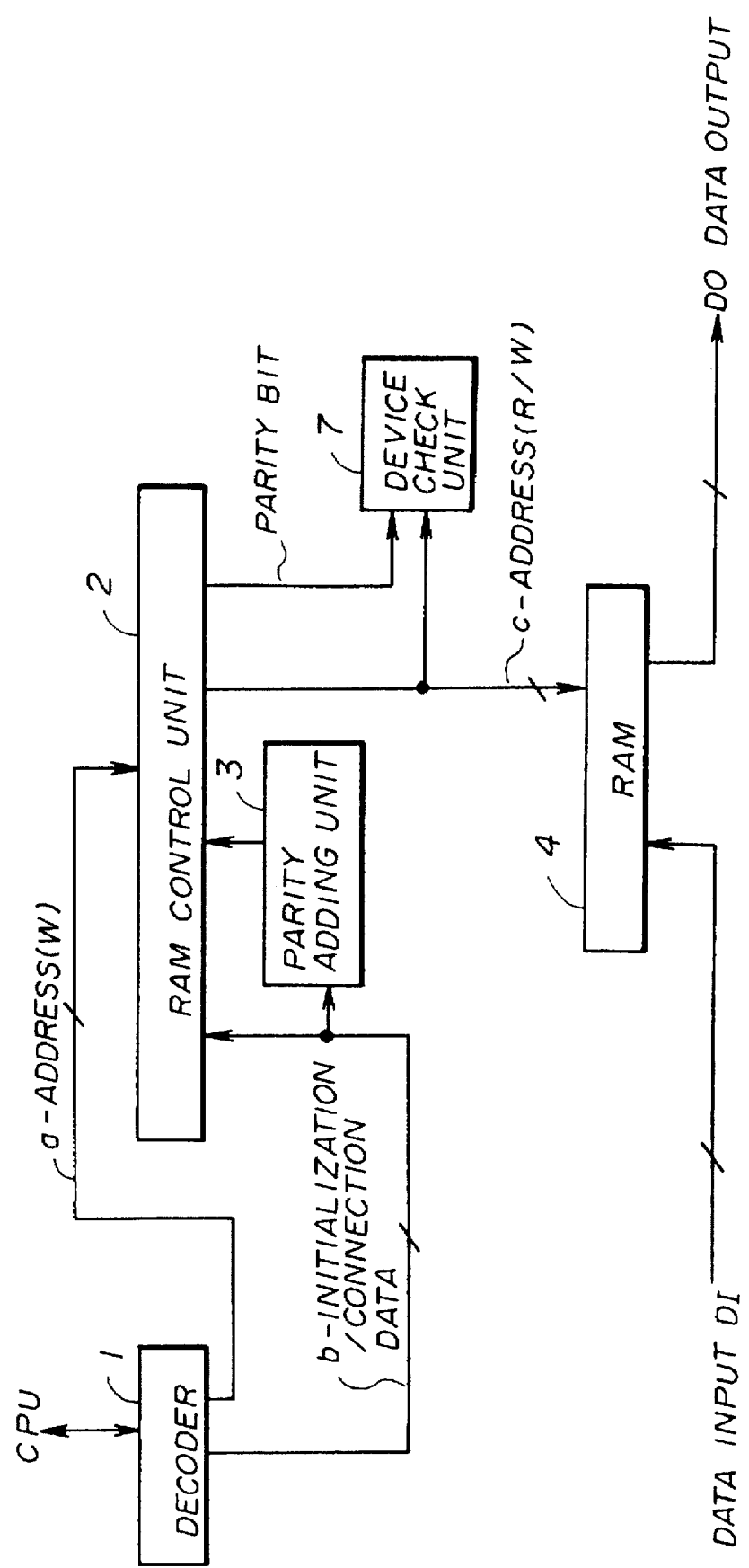
FIG. 1 shows a block diagram of a data replacement system of related art.

In principle, the above described operations performed by the initialization unit 5 are identical to those of the initialization operation in the related art described with reference to FIG. 1. However, a clock signal (FIG. 4F) being used in the initialization unit 5 is provided from outside of the CPU and has a clock rate or clock speed higher than that of a clock signal used by the CPU. As a result, an initialization operation speedier than that by means of the CPU can be realized by means of the initialization unit 5 using a clock signal having a clock rate as high as possible for the RAM control unit 2.

An embodiment of the initialization unit 5 shown in FIG. 3 will be described with reference to FIG. 5. In the initialization unit 5 of FIG. 5, the address control unit 51 shown in FIG. 3 comprises three 161-series hexadecimal counters (such as 74HC161 or 74LS161, for example) 51-1, 51-2 and 51-3. (The terms 161-series hexadecimal counters, 74HC161, and 74LS161 refer to standard logic ICs using TTL (Transistor Transistor Logic) or CMOS (Complementary Metal Oxide Semiconductor) technology, for example, and are internationally defined for various functions. The definition is believed to be in accordance with IEC (International Electrotechnical Commission.)) The initialization start command d is provided to an enable terminal EN of the counter 51-1, a ripple-carry terminal RCO of the counter 51-1 being connected to an enable terminal EN of the counter 51-2. A ripple-carry terminal RCO of the counter 51-2 is connected to an enable terminal EN of the counter 51-3.

Then, the addresses e comprise 12-bit output A0–A11 comprising four-bit output A0–A3 of the counter 51-1, four-bit output A4–A7 of the counter 51-2 and four-bit output A8–A11 of the counter 51-3.

The external clock signal i is provided to respective clock terminals CLK of the counters 51-1, 51-2 and 51-3.

The initialization table unit 52 shown in FIG. 3 comprises a ROM 52-1 and a NOT gate 52-2 and a latch 52-3. The ROM 52-1 inputs therein the 12-bits A0–A11 output from the counters 51-1, 51-2 and 51-3 as the addresses of the ROM 52-1. Then, the ROM 52-1 provides 12-bits data output D0–D11 acting as the initialization data f in response to the thus provision of the addresses A0–A11.

Further, thirteenth-bit data output D12 of the ROM 52-1 is provided to a set input terminal S of the latch 52-3. The NOT gate 52-2 inverts the provided initialization start command d as shown in FIG. 5 and then provides the resulting inverted data to a reset input terminal R of the latch 52-3. The output of the latch 52-3 is used for the initialization completion report j. A 279-series latch such as ALS279, HC279, for example may be used as the latch 52-3. (The terms 279-series latch, ALS279, and HC279 also refer to standard logic ICs using TTL (Transistor Transistor Logic) or CMOS (Complementary Metal Oxide Semiconductor) technology, for example, and are also internationally define for various functions. The definition is also believed to be in accordance with IEC (International Electrotechnical Commission.))

Figure 5:
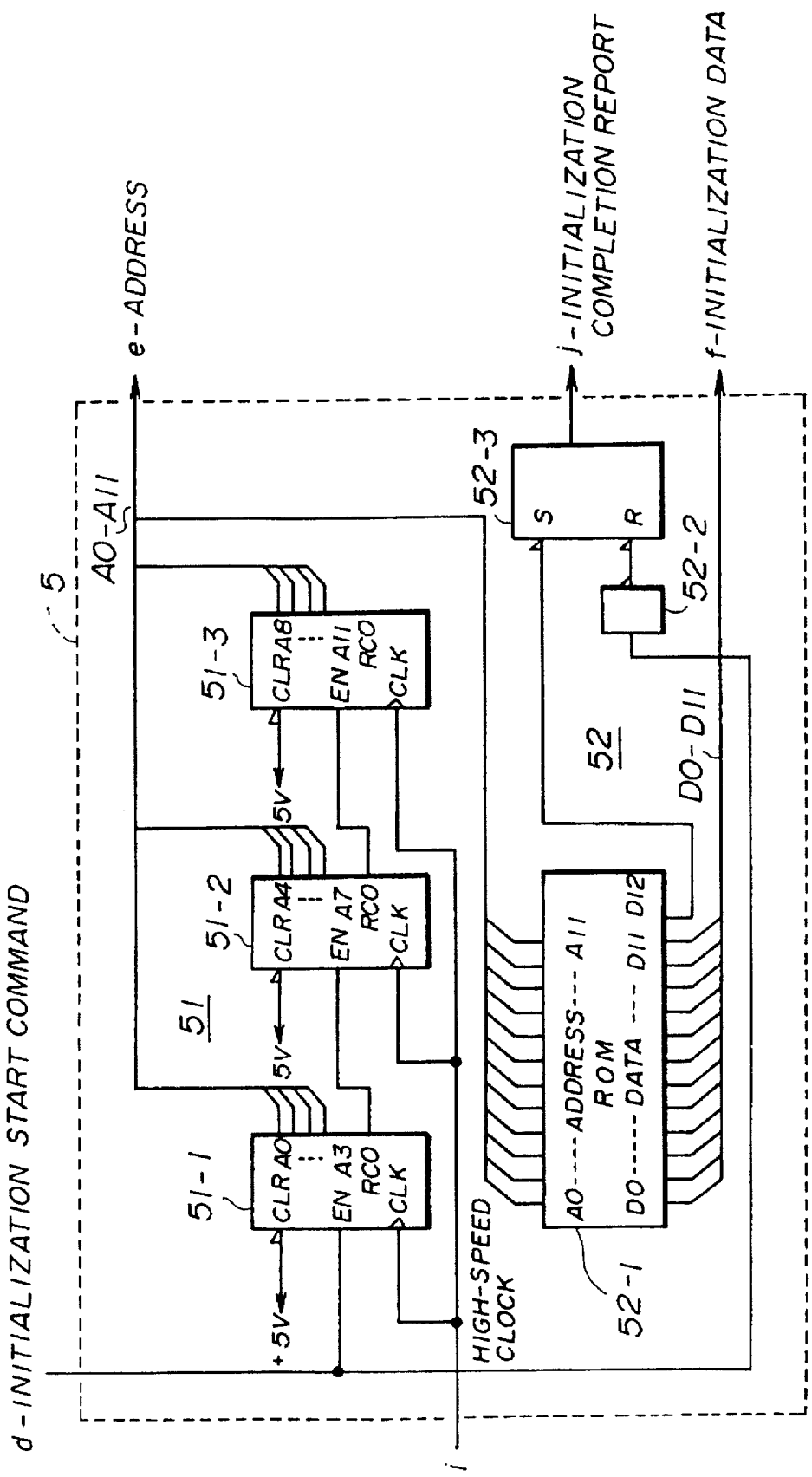
FIG. 5 shows an embodiment of an initialization unit of the system of FIG. 3.

In operations of the arrangement of FIG. 5, before the initialization operation is performed, the initialization start command d has the low level as shown in FIG. 4B. Due to this low level, the high-level is provided to the reset input terminal R of the latch 52-3 through the NOT gate 52-2. As a result, the initialization completion report j has the low level.

Then, after the initialization start command d becomes so as to have the high level so that the initialization operation is to be started, the counters 51-1, 51-2 and 51-3 start their counting operations. A range by which the counters 51-1, 51-2 and 51-3 may count is from 0 to the memory capacity of the ACM 23. The counting by means of the counters 51-1, 51-2 and 51-3 causes the 12-bit initialization data f (D0–D11) to be output from the counters 51-1, 51-2 and 51-3 until the counting arrives at the number corresponding to the memory capacity of the ACM 23. Then, after the counting to the memory capacity of the ACM 23 is completed, the output D12 of the ROM 52-1 becomes so as to have the high level, the high level then cause the latch 52-3 to become the set state. As a result, the initialization completion report j is sent to the CPU via the decoder 1.

Figure 2:
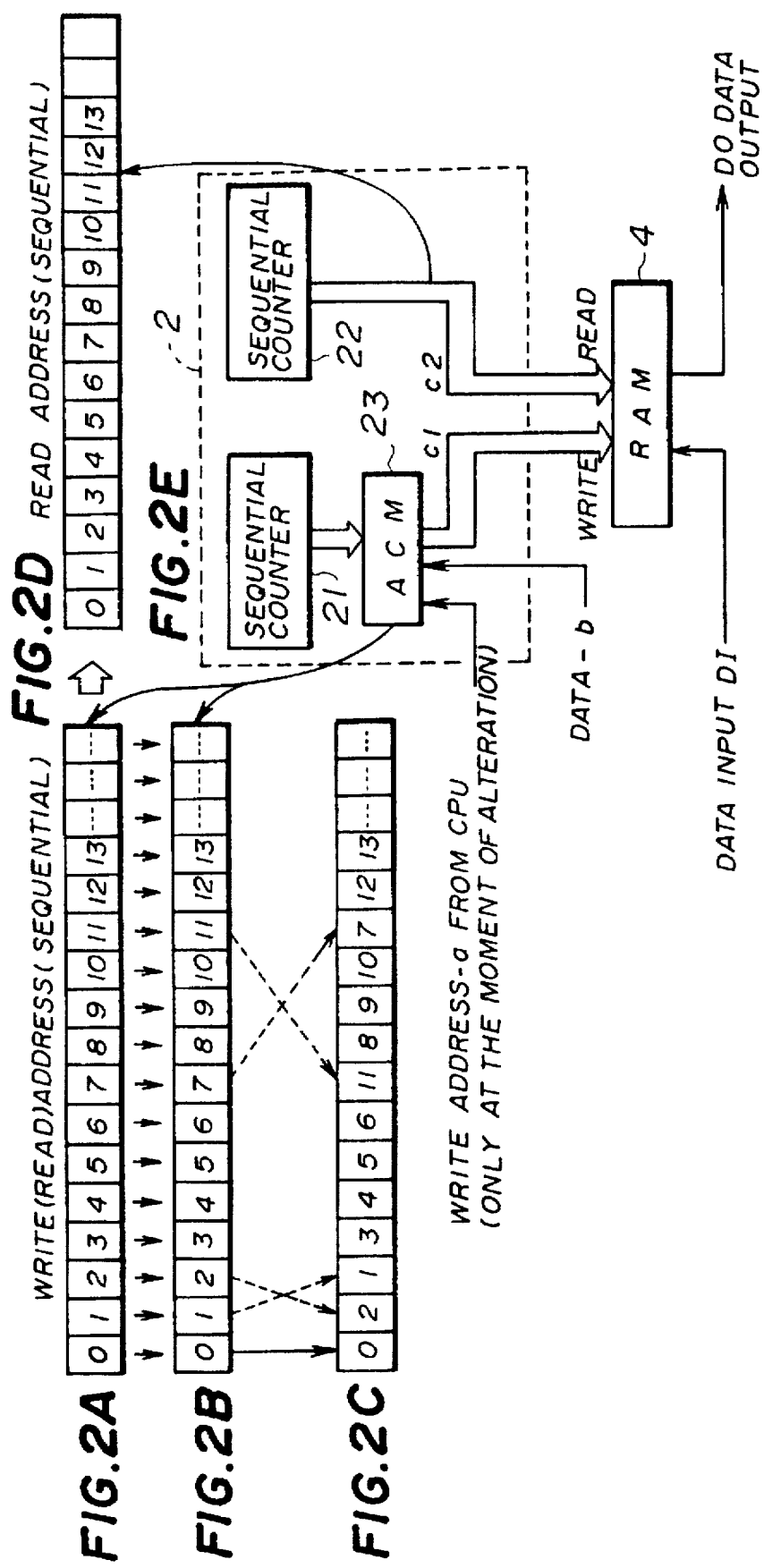
FIGS. 2A, 2B, 2C, 2D and 2E illustrate an arrangement and operations in a RAM control unit which may be used either in the data replacement system of FIG. 1 or in a data replacement system according to the present invention.

The initialization data previously set in the ROM 52-1 may comprise any data. The data may comprise data such that the communication-circuit setting operation is made through, for example. Making the communication-circuit setting operation through means as follows: The data and the addresses are made to successively correspond to one another so that the data shown in FIG. 2B is written for the addresses shown in FIG. 2A. As a result, the data input via the line DI is output via the line DO as it is without any data replacement being performed thereon. In a case where the initialization data comprises bits either each being "0" or each being "1", a simple logical circuit is sufficient for replacing the ROM. Alternatively, it is also possible that the initialization data comprises data which is used not only for the initialization operation but also for the communication-circuit setting.

Figure 6:
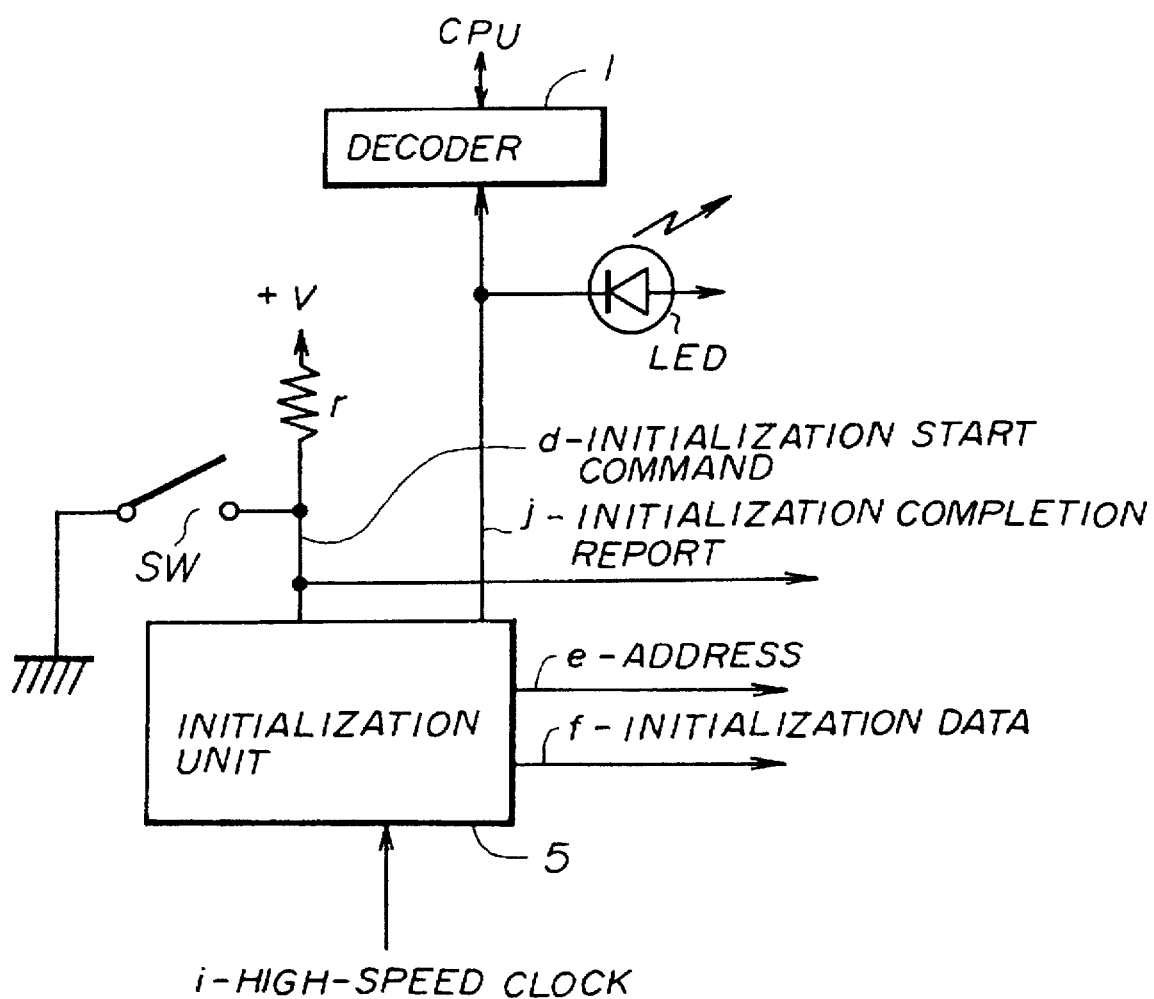
FIG. 6 shows another embodiment, of an initialization unit, according to the present invention.

Another embodiment, according to the present invention, of a circuit construction associated with the initialization unit 5 will now be described with reference to FIG. 6. In FIG. 6, the initialization unit 5 itself may comprise the arrangement shown in FIG. 5. In FIG. 6, the initialization unit 5 does not receive the initialization start command d from the CPU and, as shown in FIG. 6, the initialization start command d is generated as a result of manual operation of a switch SW.

That is, while the switch SW is at the ON state (closed), the initialization start command d has the low level so that the initialization operations are not carried out. On the other hand, when the switch SW is turned OFF (opened), the positive voltage source +V is supplied to the initialization unit 5 via the resistor r so that the initialization start command d becomes so as to have the high level. The high level of the command d specifies the start of the initialization operation for the initialization unit 5 and also the appropriate switching operation for the selector 6.

Then, after the initialization operation is completed, the initialization completion report j, being sent to the CPU via the decoder 1, causes a light emitting diode (LED) to emit light. Thus, the initialization completion is informed to the operator.

An embodiment, of the selector 6 shown in FIG. 3, according to the present invention will now be described with reference to FIG. 7. The selector 6 of FIG. 7 comprises two OR gates 61 and 62. The addresses a provided through the decoder 1 and the addresses e provided from the address control unit 51 (counters 51-1, 51-2 and 51-3) are supplied to the OR gate 61, the OR gate 61 then providing addresses g. On the other hand, the data d provided through the decoder 1 and the initialization data f provided from the initialization table unit 52 (ROM 52-1) are supplied to the OR gate 62, the OR gate 62 then providing data h.

Figure 7:
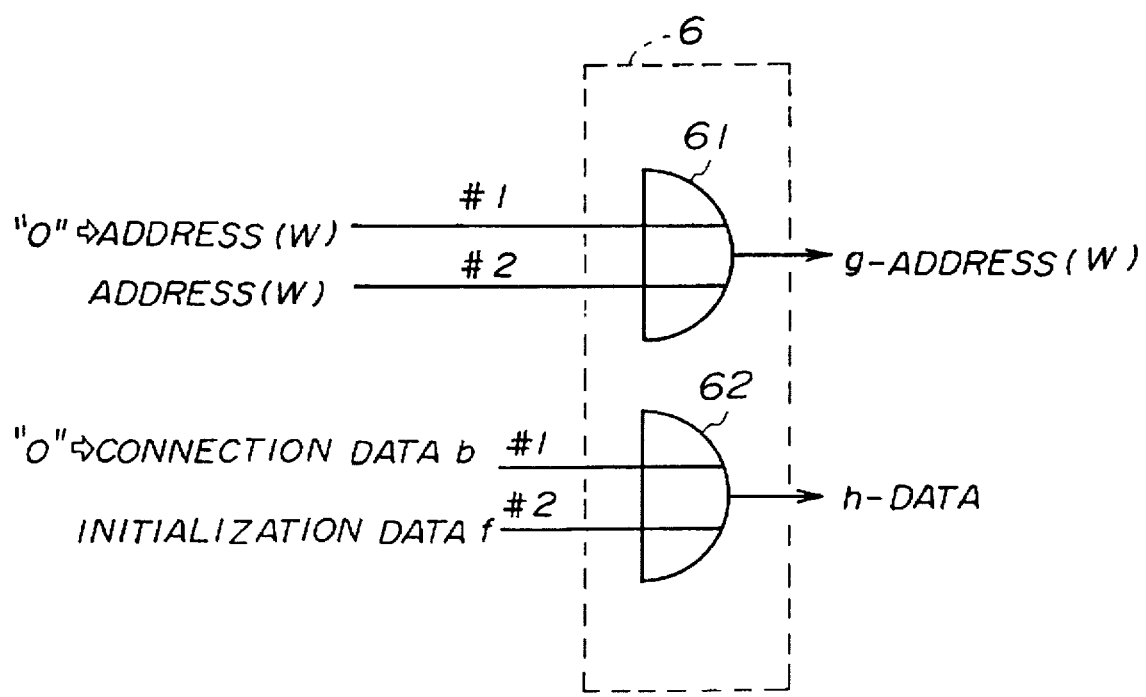
FIG. 7 shows an embodiment of a selector of the system of FIG. 3.

In the case where the selector of FIG. 7 is used in the system of FIG. 3, during the initialization operation, a value of "0" is set as the addresses a and the data b respectively. As a result, the addresses e and the initialization data f are output from the selector 6, as they are, then acting as the addresses g and the data h respectively.

Further, the present invention is not limited to the above described embodiments, and variations and modifications may be made without departing from the scope of the present invention.

What is claimed is:

1. A data replacement system comprising:

a control unit for generating control data;

data replacing means for replacing a portion of predetermined data in a data replacement operation provided by said control unit as necessary;

initializing means, coupled to said control unit and being supplied with a high-speed clock, for generating initializing data using said high-speed clock, said high-speed clock having a clock speed which is higher than that used by said control unit, said initializing data being supplied to said data replacement means for initializing said data replacing means so as to refresh said data replacing means before a data replacement operation is started therein; and selecting means, coupled to said control unit and said initializing means, for selecting data supplied therefrom, initially and until the initialization is completed, so that said initializing data is provided from said initializing means to said data replacing means independently from said control unit and while said control data is not being provided to said data replacing means.

2. The data replacement system according to claim 1, wherein said selecting means starts the selection, such that said initializing data is provided to said data replacing means but said control data is not provided thereto, when an initializing command is supplied by said control unit to said initializing means.

3. The data replacement system according to claim 1, and further comprising an initializing signal producing means for producing an initializing signal, wherein said selecting means starts the selection, such that said initializing data is provided to said data replacing means but said control data is not provided thereto, when said initializing signal is supplied from said initializing signal producing means.

4. The data replacement system according to claim 1, wherein said data replacing means comprises:

storing means for storing said predetermined data at respective corresponding addresses; and control means for providing addresses, successively in a writing sequence and a reading sequence respectively, to said storing means so that said predetermined data are written therein and read therefrom, respectively, successively according to said addresses sequentially provided by said control means;

wherein:

said writing sequence and reading sequence are set by the initialization operation; and setting data is provided by said control unit, said setting data indicating an alteration operation in which either said writing sequence or said reading sequence is initially altered.

5. The data replacement system according to claim 1, further comprising:

parity adding means for adding a parity bit to the data which will be provided to said control means, the parity-bit-added data then being supplied to said control means; and parity checking means for performing parity checking on the data processed in said second control means using said parity bit.

6. The data replacement system according to claim 1, wherein said initializing means comprises:

address generating means for generating addresses; and table means for, using a relevant table, providing said initializing data in response to said addresses generated by said address generating means.

7. The data replacement system according to claim 6, wherein said address generating means comprises a counter.

8. The data replacement system according to claim 6, wherein said table means comprises a read only memory in which said initializing data is previously stored according to totality of said addresses by said address generating means.

9. The data replacement system according to claim 1, wherein:

said selecting means comprises a logical OR gate;

said setting data provided by said first control means and said initializing data provided by said initializing means are simultaneously supplied to said logical OR gate; and said setting data has a logical value of 0 while the initializing operation is performed.

10. The data replacement system according to claim 1, wherein said predetermined data comprises data used for setting a communication circuit.

* * * * *